United States Patent Office 3,507,926
Patented Apr. 21, 1970

3,507,926
PROCESS FOR CYCLOOLIGOMERIZING CONJUGATED DIENES
Jerome R. Olechowski, Trenton, N.J., assignor to Columbian Carbon Company, New York, N.Y., a corporation of Delaware
No Drawing. Filed Dec. 28, 1967, Ser. No. 694,049
Int. Cl. C07c 1/00
U.S. Cl. 260—666                                          10 Claims

ABSTRACT OF THE DISCLOSURE

Processes are described for oligomerizing a conjugated diene in the presence of a catalyst comprising a chromium (II), (III) or (VI) halide and a hydrocarbyl aluminum compound and recovering the cyclic trimer product. The production of solid polymer in such system is minimized by employing these catalyst components in conjunction with a small quantity of an aluminum halide. Illustrations are presented of the preparation of such improved catalysts and their use to convert 1,3-butadiene to its cyclic trimer, 1,5,9-cyclododecatriene.

BACKGROUND OF THE INVENTION

Field of the invention

This invention relates to an improved process for cyclooligomerizing a conjugated aliphatic diene in the presence of a chromium (II), (III) or (VI) halide and a hydrocarbyl aluminum compound. More specifically, it relates to a process for minimizing the formation of solid polymer byproduct during such oligomerization reaction by the addition of a third catalyst component, an aluminum halide containing up to about 3.5 atoms of halogen per atom of halogen in the chromium halide.

Description of the prior art

The use of coordination catalysts derived from a chromium halide and a hydrocarbyl aluminum compound to cyclooligomerize conjugated aliphatic dienes is well known. For example, U.S. Patent 2,979,543 describes the cyclooligomerization of 1,3-butadiene, isoprene or piperylene in the presence of a catalyst derived from chromic chloride or chromyl chloride and from four to five moles per mole of the chromium compound of an aluminum trialkyl, alkyl aluminum hydride or dialkyl aluminum monohalide. Since catalysts of this type which are derived from chromic chloride require many hours to develop properly and those employing a dialkyl aluminum halide as the aluminum component are well known producers of solid polymer, the major emphasis in research on the use of these catalysts in the preparation of cyclic oligomers of conjugated dienes, such as cyclododecatriene, has been directed to combinations of chromyl chloride and either a trialkyl aluminum or alkyl aluminum hydride. While these systems are highly effective under laboratory conditions where trace quantities of impurities in the catalyst components, solvent and monomer can be essentially excluded, their commercial applicability has been limited because of erratic results which have been attributed to such impurities. This extreme sensitivity to impurities is illustrated by a comparison of Example 3 of U.S. Patent 2,979,543 with Example 10 of Belgian Patent 545,952. In the former, high purity catalyst components and butadiene are contacted under laboratory conditions to produce a high yield of cyclododecatriene with less than 2% of solid polymer byproduct. The latter example, which differs primarily in the use of commercial monomer (95% butadiene) results in a 38% yield of solid polymer.

SUMMARY OF THE INVENTION

Applicant has now discovered a method of modifying catalysts derived from chromium (II), (III) or (VI) halides and hydrocarbyl aluminum compounds, such as aluminum trialkyls, alkyl aluminum hydrides or alkyl aluminum alkoxides, which renders these catalysts far less sensitive to trace impurities when employed in the cyclooligomerization of conjugated aliphatic dienes. This improvement, which minimizes the formation of solid polymer product and therefore simplifies the recovery the desired cyclic oligomer, is effected by employing a third catalyst component, an aluminum halide containing up to about 3.5 atoms of halogen per atom of halogen in the chromium halide catalyst component and adjusting the proportions of the catalyst components as described below.

The fact that the addition of a small but critical quantity of aluminum halide diminishes solid polymer formation is quite surprising in view of the well known propensity of chromium halide/alkyl aluminum halide catalysts to produce large quantities of solid conjugated diene polymer (e.g., see Example 2, below).

DESCRIPTION OF THE PREFERRED EMBODIMENTS

Broadly, the process of the instant invention involves contacting an open chain conjugated aliphatic diene with a catalyst composition comprising (A) a chromium (II), (III) or (VI) halide component, (B) a hydrocarbyl aluminum component of the formula (R) (R') (R") Al, in which R is a hydrocarbyl group and R' and R" are each selected from the group consisting of R, H and OR groups and (C) and aluminum halide component containing up to about 3.5 atoms of halogen per atom of halogen in component A. The atomic ratio of halogen in component C to aluminum in components B and C must be less than 1:1 and the atomic ratio of aluminum to chromium in the catalyst composition should be at least about 3:1.

The improvement resulting from operation in accordance with this invention is notable when the added aluminum halide catalyst component contains from as little as about 0.025 to as much as about 3.5 atoms of halogen per atom of halogen in the chromium halide catalyst component. While many of the advantages of this invention can be realized at ratios of 2.5 to 3.5, or even slightly above 3.5, the use of such high ratios is seldom desirable from either the standpoint of economy or performance. Outstanding results can be obtained.

With chromium trihalide based catalysts when this ratio is from about 0.1 to about 1.0, preferably at least about 0.2. The optimum ratio with chromium dihalide based catalysts is generally somewhat higher, from about 0.3 to about 2.0, preferably at least about 0.5.

Another critical relationship in the catalysts of this invention is the atomic ratio of halogen in the aluminum halide component to total aluminum (i.e. the aluminum in both the aluminum halide and hydrocarbyl aluminum components). As indicated above, this ratio must be less than 1:1 and preferably is from less than about 1:2 to 1:6 or lower.

The atomic ratio of total aluminum to chromium in the catalyst compositions of this invention may be varied over a wide range from about 3:1 to 20:1 or higher. Generally it is preferred to operate within the range of from about 4:1 to about 15:1. Outstanding results are obtained with both chromium dihalide and trihalide based catalysts when this total aluminum to chromium atomic ratio is from about 6:1 to about 12:1 and the atomic ratio of aluminum halide halogen to total aluminum is less than about 1:2.

Exemplary of the chromium halides which can be employed in the process of this invention are; chromous chloride, chromous bromide, chromous iodide, chromic chloride, chromic bromide, chromic iodide, chromyl chloride and chromyl fluoride. Because of their solubility properties, the use of chromous and chromyl halides, especially chromous chloride, is preferred.

Aluminum compounds of the formula

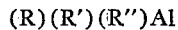

(R)(R')(R'')Al are represented by trimethyl aluminum, triethyl aluminum, triisobutyl aluminum, tri-n-octyl aluminum, tri-n-decylaluminum, triphenyl aluminum, diethylaluminum hydride, and ethoxy aluminum diethyl. Of this group, the trihydrocarbyl aluminum compounds, such as triethyl aluminum, are especially preferred.

The aluminum halide catalyst component of this invention can be any hydrocarbyl aluminum halide or inorganic aluminum halide. Exemplary of such suitable compounds are: diethylaluminum chloride, di-isobutyl aluminum chloride, diethylaluminum bromide, ethylaluminum dichloride, ethylaluminum dibromide, phenylaluminum dibromide, ethylaluminum sesquechloride, aluminum trichloride and aluminum tribromide. The hydrocarbon soluble alkyl aluminum halides, such as diethylaluminum chloride and ethylaluminum dichloride, represent a preferred group of such compounds.

The catalyst components may be interacted in the presence or absence of a solvent; however, it is preferable to utilize an inert reaction medium to facilitate temperature control within the limits discussed below. Typical of such inert reaction media are the liquid saturated aliphatic hydrocarbons, n-hexane, iso-octane and cyclohexane; the cyclic ethers, dioxane and tetrahydrofuran; the aromatic hydrocarbons, benzene, toluene and xylene; and the ring chlorinated aromatics, chlorobenzene and chlorotoluene. The use of benzene or toluene is greatly preferred. The catalyst components may be admixed and stored for considerable periods of time prior to use or the admixture may be effected immediately prior to use. It is also possible, and often advantageous, to prepare the catalysts of this invention in the presence of ethylenically unsaturated hydrocarbons, such as butadiene, isoprene, piperylene or a portion of the unquenched reaction product of a pervious butadiene, isoprene or piperylene cyclooligomerization reaction. When the catalyst is prepared in the presence of an ethylenically unsaturated hydrocarbon, it is generally preferred that the hydrocarbyl aluminum and aluminum halide components be premixed and that this mixture be added to an inert solvent solution or slurry of the chromium halide components and the ethylenically unsaturated hydrocarbon.

The oligomerization of open chain conjugated aliphatic dienes, such as butadiene, isoprene or piperylene, in the presence of the catalyst compositions described above may be conducted over a wide temperature range from below 0° C to above 125° C. Inasmuch as satisfactory results can be achieved by operating at from about room temperature to about 100° C., there is little advantage in employing extreme temperatures.

Similarly, such as cyclooligomerization reactions may be conducted under pressures ranging from subatmospheric up to 100 atmospheres or higher; however, more moderate pressures have been found to be equally satisfactory. When the reaction is conducted in the absence of solvent or with insufficient solvent to dissolve significant amounts of a monomer which under atmospheric pressure and reaction temperature is in the vapor phase, it is, of course, preferred to use elevated pressures. Thus, for example, in the cyclooligomerization of butadiene at a temperature from about 25° C. to 100° C., superior results are obtianed by operating under pressures of from about 30 p.s.i.g. to about 100 p.s.i.g. and maintaining this pressure during the course of the reaction by introducing additional butadiene as the monomeric material in the reactor is depleted.

The quantity of catalyst used in the process of this invention likewise may be varied over a wide range. In general, these catalysts are effective in amounts containing from less than about 0.05 millimole of chromium to as much as one mole or more per mole of conjugated diene monomer. In continuous reactions or semi-batch reactions (in which the conjugated diene is added on demand), the mole ratio of catalyst to unreacted monomers is generally considerably higher than in a batch reaction.

The process of this invention is applicable to the cyclooligomerization of both high purity open chain conjugated aliphatic dienes and commercial materials. The use of this process is particularly advantageous when the diene contains significant quantities of the reactive impurities normally found in commercially available monomers; e.g. monoolefins, acetylenes, carbonyl compounds, ammonia, allenes and water. Many of the beneficial effects of operation in accordance with this invention can be realized when the level of such reactive impurities is as high as about 5%. At levels above about 2.5%, catalyst life may be shortened and it is, therefore, desirable to employ a somewhat higher total aluminum to chromium ratio than the preferred range disclosed above.

The numerous advantages inherent in the instant invention will be evident from an examination of the following comparative examples. Examples 1 and 2 represent the prior art processes for cyclooligomerizing conjugated dienes in which the conjugated diene is high purity 1,3-butadiene. Example 3 illustrates the improvement which results from operation in accordance with this invention when employing such high purity butadiene. Example 4 shows the effect of using a typical commercial butadiene (having the composition shown in Table I) in the prior art process. Example 5 illustrates the vast improvement which operation in accordance with the instant invention effects in the cyclooligomerization of such commercial butadiene. The further improvement which can be obtained in the cyclooligomerization of commercial butadiene by employing the preferred ratios of catalyst components of this invention is illustrated by Example 6.

TABLE I

| Commercial butadiene component: | Weight percent |
|---|---|
| Butadiene-1,3 | 98.36 |
| Isobutylene | 0.025 |
| Trans-butene-2 | 0.065 |
| Cis-butene-2 | 0.065 |
| Propylene | 0.58 |
| Propadiene | 0.075 |
| Butadiene-1,2 | 0.10 |
| Acetylenes (including methacetylene, ethylacetylene, vinylacetylene and dimethylacetylene) | 0.06 |
| Carbonyl compounds (as carbonyl) | 0.002 |
| Water | 0.02 |
| Tert-butyl-catechol | 0.005 |

EXAMPLE 1

A clean dry magnetically stirred autoclave is flushed with argon and charged with 8.2 millimoles of chromous chloride, 36.9 millimoles of triethylaluminum and 40 milliliters of dry benzene. The mixture is stirred at room temperature for ten minutes and then heated rapidly to 80° C., at which temperature the autoclave is pressured to 60 p.s.i.g. with high purity 1,3-butadiene. Additional high purity butadiene is introduced on demand at 80° C. and 60 p.s.i.g. for 90 minutes, at which time 71 grams of butadiene have been introduced. The butadiene flow is then terminated and the autoclave is agitated for an additional ten minutes at 80° C. After cooling to room temperature and venting unreacted gases, the catalyst is deactivated by the addition of 75 milliliters of methanol.

White solid polybutadiene is precipitated during this quenching operation which represents a 3% yield based on the converted butadiene.

EXAMPLE 2

The procedure of Example 1 is repeated employing 36.9 millimoles of diethylaluminum chloride in place of triethylaluminum. Butadiene uptake amounts to 68 grams. The yield of white solid polybutadiene is over 50% based on the converted monomer.

EXAMPLE 3

The procedure of Example 1 is repeated employing a mixture of 28.7 millimoles of triethylaluminum and 8.2 millimoles of diethylaluminum chloride in place of the 36.9 millimoles of triethylaluminum. Butadiene uptake amounts to 77 grams and no observable solid high polymer is precipitated during the quenching operation.

EXAMPLE 4

The procedure of Example 1 is repeated employing commercial butadiene in place of high purity monomer. The monomer feed introduced into the autoclave contains 63 grams of butadiene. The yield of product, based on converted butadiene, is 6% of cyclododecatriene and 92% of higher boiling materials, including a large quantity of solid polybutadiene.

EXAMPLE 5a

The procedure of Example 4 is repeated employing a mixture of 28.7 millimoles of triethylaluminum and 8.2 millimoles of diethylaluminum chloride in place of 36.9 millimoles of triethylaluminum. The commercial monomer feed that is taken up contains 78 grams of butadiene. Analysis of the converted butadiene shows 67% cyclododecatriene, less than 29% higher boiling materials and no observable solid high polymer.

EXAMPLE 5b

Procedure of Example 5a is repeated, except that 8.2 millimoles of chromic chloride is employed in place of chromous chloride and the mixture of the three catalyst components is stirred in the reactor at 80° C. for 24 hours prior to the introduction of butadiene. The results are similar to those of Example 5a.

EXAMPLE 6

A clean dry magnetically stirred autoclave is flushed with argon and charged with 8.2 millimoles of chromous chloride, 4.1 millimoles of diethylaluminum chloride, 4.1 millimoles of ethylaluminum dichloride and 40 milliliters of dry benzene. After stirring the mixture for ten minutes at room temperature, 49.2 millimoles of triethylaluminum is added and the mixture rapidly heated to 80° C., at which temperature the autoclave is pressured to 60 p.s.i.g. with commercial butadiene. Additional monomer is added on demand and the autoclave maintained at 80° C. and 60 p.s.i.g. for ninety minutes, at which time 98 grams of commercial butadiene have been introduced. The butadiene flow is then terminated and the autoclave contents agitated for an additional ten minutes at 80° C. After cooling to room temperature and venting unreacted gases, the catalyst is deactivated by the addition of 75 milliliters of methanol. No observable high polymer is precipitated during this operation. The yield of cyclododecatriene, based on converted butadiene, is over 75% with less than 19% yield of higher boiling materials.

I claim:

1. In a process for cyclooligomerizing an open chain conjugated aliphatic diene selected from butadiene and methyl-butadienes by contacting said diene with a catalyst composition comprising the entire interaction product of a chromium (II), (III), or (VI) halide component and a hydrocarbyl aluminum component of the formula (R) (R′) (R″) Al, wherein R is a hydrocarbyl group and R′ and R″ are each selected from the group consisting of R, H and OR groups, the improvement comprising modifying said catalyst composition by the addition thereto of an aluminum halide component containing from about 0.025 to about 3.5 atoms of halogen per atom of halogen in said chromium halide component and employing said components in such proportions as to provide an atomic ratio of aluminum to chromium in said modified composition of from about 3:1 to about 20:1 and an atomic ratio of halogen in said aluminum halide component to aluminum in both of said aluminum components of less than 1:1.

2. The process of claim 1 wherein said diene is 1,3-butadiene.

3. The process of claim 1 wherein said hydrocarbyl aluminum component is a trialkylaluminum.

4. The process of claim 1 wherein said aluminum halide component is an alkyl aluminum chloride.

5. The process of claim 1 wherein said modified catalyst composition is produced by adding said hydrocarbyl aluminum component to an admixture of said chromium and aluminum halide components.

6. The process of claim 1 wherein the atomic ratio of aluminum to chromium in said modified catalyst composition is from about 6:1 to about 12:1 and the atomic ratio of halogen in said aluminum halide to aluminum is less than about 1:3.

7. The process of claim 6 wherein said chromium halide is chromic halide and said aluminum halide contains from about 0.1 to about 1 atom of halogen per atom of halogen in said chromium halide.

8. The process of claim 6 wherein said chromium halide is a chromium dichloride and said aluminum halide contains from about 0.3 to about 2 atoms of halogen per atom of halogen in said chromium halide.

9. The process of claim 8 wherein said chromium halide is chromous chloride.

10. In a process for cyclooligomerizing 1,3-butadient by contacting said butadiene with a catalyst derived from a chromium halide and a hydrocarbyl aluminum compound, the improvement of employing as said catalyst a composition comprising the entire interaction product of
 (A) a chromium dichloride component,
 (B) a trialkyl aluminum component and
 (C) an alkyl aluminum chloride component,
wherein said composition contains an atomic ratio of aluminum to chromium of from about 6:1 to about 12:1, the atomic ratio of chlorine in component C to chlorine in component A is from about 1:2 to about 2:1 and the atomic ratio of chlorine in component C to aluminum in components B and C is less than 1:2.

References Cited

UNITED STATES PATENTS

| | | |
|---|---|---|
| 3,366,701 | 1/1968 | Wadsworth. |
| 3,390,196 | 5/1968 | Chappell et al. |
| 3,326,990 | 6/1967 | Clark _____ 260—666 |
| 3,429,940 | 2/1969 | Wadsworth _____ 260—666 |
| 3,450,732 | 6/1969 | Wilke et al. |

DELBERT E. GANTZ, Primary Examiner

V. O'KEEFE, Assistant Examiner

U.S. Cl. X.R.

252—431; 260—438.5